United States Patent
d'Auria et al.

(10) Patent No.: US 7,370,676 B2
(45) Date of Patent: May 13, 2008

(54) SLEEVE WITH INSERT FOR REPAIRING HIGH-PRESSURE FLUID PIPES

(75) Inventors: Stanislas Boulet d'Auria, Cap d'Ail (FR); Hacen Slimani, André de Joly (FR)

(73) Assignees: 3X Engineering, Monaco (MC); Submin Limited, Dublin (IE)

( * ) Notice: Subject to any disclaimer, the term of this patent is extended or adjusted under 35 U.S.C. 154(b) by 0 days.

(21) Appl. No.: 10/543,750

(22) PCT Filed: Feb. 24, 2004

(86) PCT No.: PCT/FR2004/000415

§ 371 (c)(1),
(2), (4) Date: Jul. 29, 2005

(87) PCT Pub. No.: WO2004/076910

PCT Pub. Date: Sep. 10, 2004

(65) Prior Publication Data

US 2006/0162797 A1    Jul. 27, 2006

(30) Foreign Application Priority Data

Feb. 24, 2003   (FR) .................................. 03 02241

(51) Int. Cl.
*F16L 55/16* (2006.01)
(52) U.S. Cl. ......................... 138/99; 138/132
(58) Field of Classification Search .................. 138/99, 138/132, 97
See application file for complete search history.

(56) References Cited

U.S. PATENT DOCUMENTS

| | | | | |
|---|---|---|---|---|
| 647,996 | A | | 4/1900 | Smith |
| 2,924,546 | A | * | 2/1960 | Shaw ........................... 156/94 |
| 3,334,663 | A | * | 8/1967 | Peterson et al. ............. 138/132 |
| 3,994,431 | A | | 11/1976 | Steiner ........................ 228/153 |
| 4,049,480 | A | * | 9/1977 | Kutschke ..................... 156/94 |
| 4,133,351 | A | * | 1/1979 | Harrison et al. .............. 138/97 |
| 4,756,337 | A | * | 7/1988 | Settineri ....................... 138/99 |
| 5,814,387 | A | * | 9/1998 | Orihara et al. ................ 428/63 |
| 6,386,236 | B1 | * | 5/2002 | Buckley ....................... 138/99 |
| 6,543,487 | B2 | * | 4/2003 | Bazinet ........................ 138/99 |
| 2001/0015234 | A1 | | 8/2001 | Gerd et al. .................. 138/172 |

FOREIGN PATENT DOCUMENTS

| | | |
|---|---|---|
| DE | 32 08 452 | 1/1983 |
| FR | 2 147 433 | 3/1973 |
| GB | 1 398 991 | 6/1975 |

* cited by examiner

*Primary Examiner*—James Hook
(74) *Attorney, Agent, or Firm*—James C. Lydon

(57) ABSTRACT

A sleeve f or repairing a fluid pipe (12), including a rigid or flexible shell (22) which forms a mold that surrounds at least one defective area (10) of the pipe. A liquid-state polymerizable material is injected into the mold, which polymerizes and seals the defective area. The sleeve also includes an insert which is made up of several coils of a filiform element (14), which is wound into a helix around the defective area of the pipe, before the polymerizable material is injected or infused.

8 Claims, 1 Drawing Sheet

SLEEVE WITH INSERT FOR REPAIRING HIGH-PRESSURE FLUID PIPES

TECHNICAL FIELD

This invention concerns the systems used for repairing pipes designed to carry high-pressure fluids such as pipelines for transporting petrol and relates particularly to a sleeve with insert for repairing high-pressure fluid pipes.

BACKGROUND

Generally speaking, a sleeve employed as an injection mould is used to seal a leak in fluid pipes. The portion to be repaired is encased by the sleeve, which forms a watertight cavity in which a polymerizable liquid material is injected. As it polymerizes, this liquid forms a coating that seals leaks and provides insulation against heat, chemicals and shocks.

Sleeves that can be used in this technique are described, for example, in the following patents: FR 2.158.895, EP 278.050, U.S. Pat. No. 4,610,740, or GB 2.119.884. They are made up of two cylindrical half-shells joined together to form a single shell covering the portion to be protected or repaired. The polymerizable liquid material (generally made of components of an epoxy resin or polyurethane resin) is then poured through an injection hole provided in the wall of the shell, into the cavity thus created.

These sleeves formed by two half-shells are thus adapted for pipes of a given diameter. Sleeves of different diameters must therefore be available to fit the various pipe diameters. This leads to the necessity of having different moulds to be able to manufacture half-shells having diameters adapted to all pipes, and thus results in a very high cost.

An attempt was thus made to use a modular sleeve as described in the patent EP 0.856.117 made up of identical moulds and thus requiring only one mould for manufacturing modules. In this technique, by varying the number of modules making up the sleeve, the latter can be adapted to pipes of different diameters. In addition, each module includes a male and female portion so that the male portion of a module can fit partially or completely into a female portion of the adjoining module. This allows a sleeve consisting of a fixed number of modules to be adapted to pipes whose diameters are between a minimum value and a maximum value. Unfortunately, due to its modular structure, this type of sleeve does not withstand very high pressures of the order of a few dozen bars to which are subjected certain pipes designed to carry fluids over long distances as is the case with petroleum pipelines.

With the aim of carrying out repairs on high-pressure pipelines, the patent U.S. Pat. No. 5,632,307 describes a device that consists of an elastic band in the form of a coil with multiple windings as on a clock spring that is placed around the pipeline at the defective area. In addition to the fact that the corroded area must be plugged, that the rigid band is difficult to install due to the spring effect, and finally that installing it requires a significant embankment under the pipeline to be able to wind the various layers of the coil, such a device cannot be used if the pipeline is oval, if it is highly bent at the defective area or if, additionally, it is necessary to grind the weld beads, if any, at this location so that the device can operate efficiently.

SUMMARY OF THE INVENTION

This is why the purpose of the invention is to provide a sleeve designed for repairing high-pressure fluid pipes.

Another purpose of the invention is to provide a sleeve designed for repairing pipes with a defective area, whatever the geometry of the pipeline or its bending radius at the location of the defective area.

The purpose of the invention is thus a sleeve for repairing fluid pipes consisting of a rigid or flexible shell acting as a mould to encase at least one defective area of the pipe and in which is injected a liquid-state polymerizable material that seals the defective area as its polymerizes. The sleeve also includes an insert made up of a plurality of turns of a thread-like element wound in a spiral around the pipe at the location of the defective area prior to the injection or infusion of the polymerizing material.

BRIEF DESCRIPTION OF THE DRAWINGS

The purposes, objects and characteristics of the invention will become more apparent from the following description when taken in conjunction with the accompanying drawings in which.

DETAILED DESCRIPTION OF THE INVENTION

Figure 1:
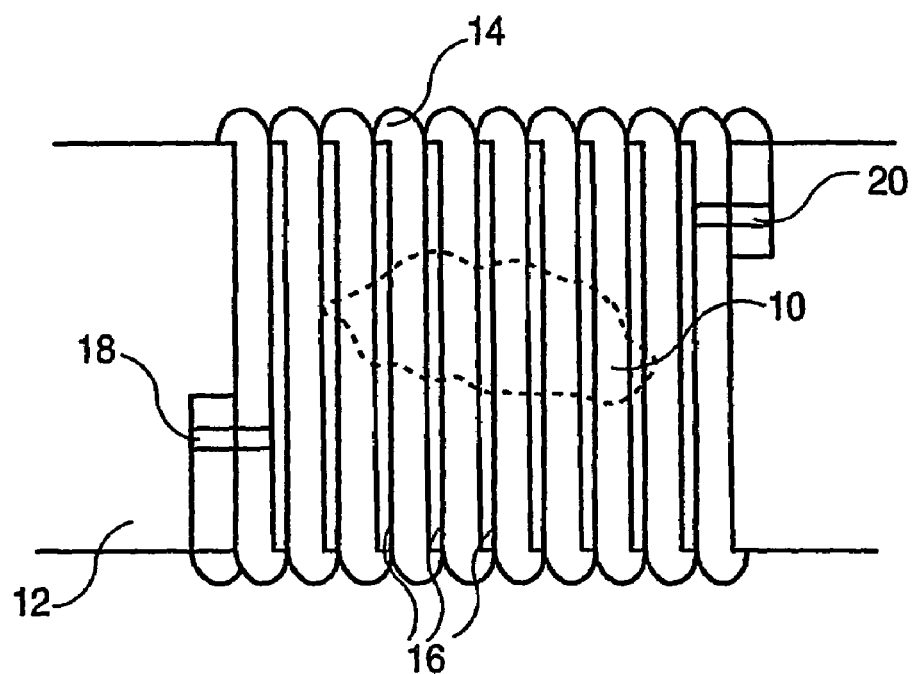
FIG. 1 represents a portion of pipeline consisting of a defective area on which an insert has been wound according to the principles of the invention.

Traditionally, a sleeve made up of a rigid or flexible closed shell in which a polymerizable material such as polyurethane or epoxy resin is injected or infused (injected by vacuum suction), is placed all around the pipeline so that the defective area is covered. Such a defective area illustrated by the dotted areas in FIG. 1 can result from corrosion of the pipeline 12 that creates a weak spot at the location where there is a reduction in the thickness of the pipeline that could be pierced under the effect of the pressure of the fluid to be carried by the pipes.

When a sleeve is installed according to the invention, a bonding and anti-corrosive material is first placed on the defective area. Then, in accordance with the invention, an insert 14 is wound and centered around the pipe so that it completely covers the defective area 10 as well as the two parts of the pipe that are not defective adjacent to the defective area.

The insert is wound helically around the pipe with a pitch that leaves a sufficient space 16 between two adjacent turns of the insert. Thus, by using a 10 mm-wide insert, a space of 1 mm can be left. This space is necessary so that the resin injected or infused into the rigid or flexible shell of the sleeve can coat the turns of the insert and adhere to the surface of the pipe wall.

When the thread-like element constituting the turns of the insert has been wound around the pipe, each of the ends of the element is fixed to the turn by a clamp 18 or 20.

Figure 2:
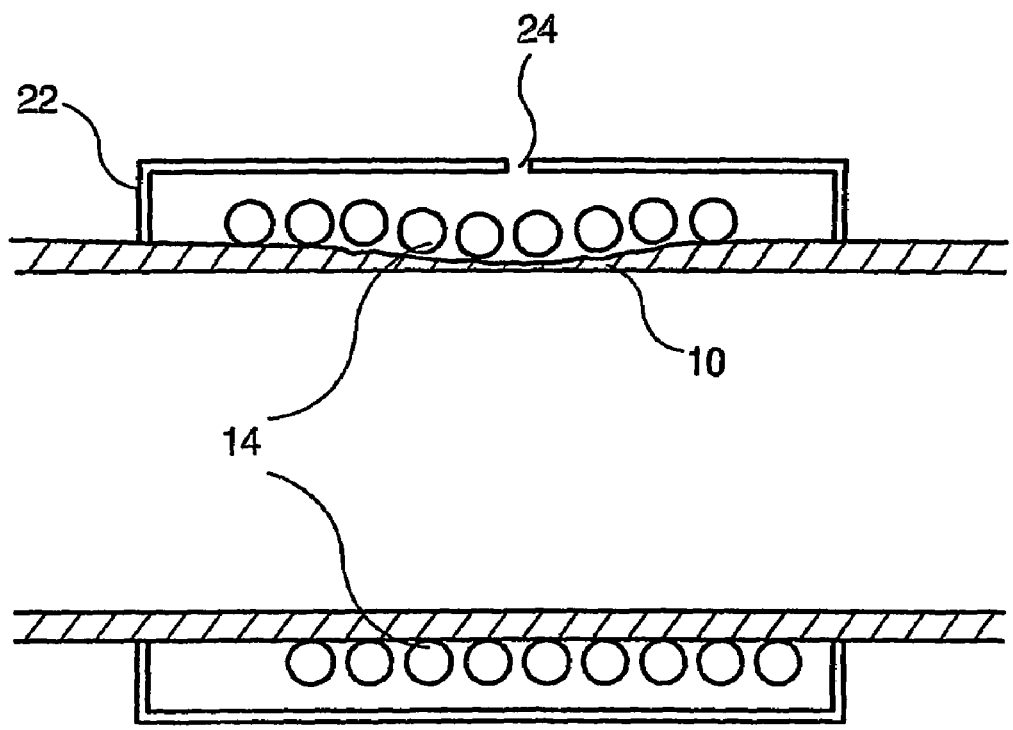
FIG. 2 represents a section of the sleeve placed around the pipeline at the location of the defective area and showing the different strands of the insert above the defective area.

The rigid or flexible shell 22 of the sleeve is then placed around the pipe as shown in FIG. 2. This rigid or flexible shell 22 must cover all turns of the insert placed beforehand around the pipe and must have sufficient height so that there is enough gap to inject or infuse polymerizable material into it. In this manner, with a 10 mm thick insert, the shell will have a height of 20 mm.

In case of infusion, the vacuum created beforehand with the help of a vacuum pump enables the flexible shell to plate and contour the support already in place. The resin can then be infused; this will ensure that the area to be repaired is completely filled by the polymerizable material.

When the rigid or flexible shell 22 has been fixed on the pipe so that it is hermetically closed, the polymerizable material in the liquid state is injected or infused inside the rigid or flexible shell through a port 24 using a vacuum pump. The quantity to be injected or infused corresponds to the filling of the shell, the polymerizable material completely covering all the turns of the insert and filling the gaps between turns.

It should be noted that the defective area 10, generally caused by corrosion, has a thickness that is clearly less than the normal thickness of the pipe wall, as shown in FIG. 2. The pipes therefore have a hollow at the location of the zone and as a result, the insert is not always in contact with the wall of the pipe at this location. This is not important so long as the resin resulting from the polymerization of the polymerizable material injected or infused completely covers the turns of the insert and acts as a transmitter of forces between the pipe wall and the insert.

The insert used in the sleeve according to the invention is a thread-like flexible element (rope), a semi-rigid element (metal braid), or a preformed element (composite spring type) suitable for being wound around the pipes. It can have a section of any shape that may be variable along the insert, but it is preferable that the insert has a circular and constant section. It may be made of any material that has good tensile strength such as aramid fiber (Kevlar® for example) and in particular it may be made of natural fibers (glass or carbon for example), synthetic fibers or prepregged fibers. The thickness of the insert or its diameter, if it is a circular section element, depends on its mechanical characteristics. It can vary from a few mm (2 mm for example), to dozens of mm (50 mm for example).

The purpose of the insert is to neutralize the radial forces that are applied on the wall of the pipe at the location of a defective area by transforming these radial forces into tractive forces distributed over each of the turns of the insert on the defective area. The radial forces exerted on the pipe walls are transmitted to the insert by the resin that fills the rigid or flexible shell and which is solid after polymerization of the polymerizable material injected or infused into the shell that plays the role of a casing here. The combination of the insert and the resin is equivalent to a composite material in which the effectiveness of the assembly to counter the radial forces being applied on the pipe walls results from the synergy between the two components.

The sleeve according to the invention may be used with pipes of all diameters ranging from 100 mm to several meters. Its width may be adapted according to the pipe, for example from 300 to several meters (limit associated with the technology of thermoplastics or infusion) and its height is preferably between 10 mm and 80 mm.

It may be used for repairing pipes whose walls are corroded to up to 80% of their thickness, whatever the width of the defective area. Thus, an area of 200 mm axial length, 300 mm peripheral width and having a depth of 5.70 mm i.e. 80% of the wall thickness (7.1 mm) of a pipe with a diameter of 324 mm has been successfully repaired.

A key feature of the sleeve according to the invention, resulting from its very structure, is its adaptability to pipes of any shape. Thus, it can be installed even when the pipes are not circular but rather oval, whatever the bending radius of the pipe (on a bend for example) and even when the pipe has an axial or peripheral weld, as it is not necessary for the insert to be in contact with the pipe wall.

The sleeve according to the invention may be used for repairing any tubular structure damaged due to reduction in thickness caused by corrosion or cracking, in order to restore its mechanical characteristics. It may be used by maintenance companies, fluid transportation maintenance companies (mainly hydrocarbons) though its use is not limited to this field. In this manner, because of its mechanical characteristics, it may be used in the building and civil engineering sector, particularly for reinforcing columns and other supporting pillars.

The invention claimed is:

1. A sleeve for repairing a fluid pipe having a defective area where there is a reduction in the thickness of the pipe, said sleeve consisting of
    a rigid or flexible shell adapted to act as a mold to encase at least said defective area and in which can be injected or infused a liquid-state polymerizable material that is adapted to seal the defective area when it polymerizes, and
    an insert made up of a plurality of turns of a thread-like element wound in a spiral around said pipe at the location of said defective area prior to the injection or infusion of said polymerizable material, wherein a pitch between two adjacent turns of said insert is constant and small with respect to the width of said insert and defines a space between adjacent turns of said insert such that said polymerizable material can coat said turns and adhere to the surface of the pipe wall, and
    wherein said sleeve is adapted to form a hermetic seal enclosing all the turns of said thread-like element.

2. A sleeve according to claim 1, wherein said pitch is about 1 mm and said turns have a width of about 10 mm so that said polymerizable material covers each of said turns during injection or infusion into said rigid or flexible shell.

3. A sleeve according to claim 2, in which said thread-like element is a flexible element of constant circular section formed of natural, synthetic or prepregged fibers.

4. A sleeve according to claim 3, in which said thread-like element is made up of aramid fibers.

5. The sleeve of claim 1, wherein a ratio between the pitch and the width of the insert is 1:10.

6. A sleeve for repairing a fluid pipe having a defective area where there is a reduction in the thickness of the pipe, said sleeve consisting of
    a rigid or flexible shell adapted to act as a mold to encase at least said defective area and in which can be injected or infused a liquid-state polymerizable material that is adapted to seal the defective area when it polymerizes, and
    an insert made up of a plurality of turns of a thread-like element wound in a spiral around said pipe at the location of said defective area prior to the injection or infusion of said polymerizable material, wherein a pitch between two adjacent turns of said insert is constant and small with respect to the width of said insert and defines a space between adjacent turns of said insert such that said polymerizable material can coat said turns and adhere to the surface of the pipe wall,
    wherein said sleeve is adapted to form a hermetic seal enclosing all the turns of said thread-like element, and
    wherein each of the ends of said thread-like element is fixed to the adjacent turn by a clamp.

7. A process for repairing a fluid pipe with a defective area consisting of
  winding a thread-like element in a spiral around the pipe at the location of said defective area,
  surrounding the portion of the pipe where said defective area is situated by a hermetically closed rigid or flexible shell, said rigid or flexible shell being adapted to completely cover the turns of said thread-like element and
  injecting or infusing in said shell a polymerizable liquid material designed to form a resin after polymerization,
  wherein a pitch between two adjacent turns of said insert is constant and small with respect to the width of said insert and defines a space between adjacent turns of said insert such that said polymerizable material can coat said turns and adhere to the surface of the pipe wall.

8. The process of claim 7, wherein a ratio between the pitch and the width of the insert is 1:10.

* * * * *